United States Patent [19]

Gehrmann et al.

[11] 3,890,399
[45] June 17, 1975

[54] PROCESS FOR THE CONTINUOUS MANUFACTURE OF 3,4-DICHLOROBUTENE-1

[75] Inventors: Klaus Gehrmann, Knapsack; Alexander Ohorodnik, Erftstadt-Liblar; Odo Dettmeier, Okriftel; Heinz-Josef Berns, Berrenrath, all of Germany

[73] Assignee: Hoechst Aktiengesellschaft, Knapsack near Cologne, Germany

[22] Filed: Sept. 5, 1972

[21] Appl. No.: 286,292

[30] Foreign Application Priority Data
Sept. 6, 1971 Germany............................ 2144475

[52] U.S. Cl. ........................... 260/654 R; 23/288 E
[51] Int. Cl.............................................. C07c 21/04
[58] Field of Search................... 260/654 H, 654 R; 23/288 E, 263

[56] References Cited
UNITED STATES PATENTS

| | | | |
|---|---|---|---|
| 2,450,753 | 10/1948 | Guyer................................ | 23/288 E |
| 2,599,466 | 6/1952 | Lienhart............................ | 23/288 E |
| 3,515,760 | 6/1970 | Wild.................................. | 260/654 R |
| 3,584,065 | 6/1971 | Oshima.......................... | 260/654 R |
| 3,759,669 | 9/1973 | Aaron et al. ..................... | 23/288 E |

FOREIGN PATENTS OR APPLICATIONS

| | | | |
|---|---|---|---|
| 800,787 | 9/1958 | United Kingdom............. | 260/654 H |
| 984,094 | 2/1965 | United Kingdom............. | 260/654 H |
| 41-419 | 1/1966 | Japan.............................. | 260/654 R |
| 1,326,286 | 3/1963 | France............................ | 260/654 R |
| 1,152,766 | 5/1959 | United Kingdom............... | 23/288 E |
| 33,438 | 11/1964 | Germany.......................... | 23/288 E |

*Primary Examiner*—Howard T. Mars
*Attorney, Agent, or Firm*—Connolly and Hutz

[57] ABSTRACT

Heterogeneous catalytic reactions are carried out continuously in liquid phase. To this end, a suspension of liquid starting material and particulate catalyst together with resulting reaction product is continuously conveyed upwardly in a reaction zone by the introduction, in accordance with the principle of an air-lift pump, of a gas near the bottom of the reaction zone, and recycled downwardly through a reflux line to the bottom of the reaction zone, the path of liquid material through the reflux line being interrupted by an injector system situated in a closed catalyst-separating zone containing recycle liquid; following establishment of the reaction equilibrium, starting material is continuously supplied to the reaction zone and crude, catalyst-free recycle liquid is continuously removed near the head of the catalyst-separating zone, and recycle liquid which is to be removed is caused to travel through the catalyst-separating zone with the injector system therein towards the recycle liquid outlet at a velocity smaller than the sedimentation velocity of the catalyst under the operational conditions prevailing.

More particularly, 1,4-dichlorobutene-2 is isomerized to 3,4-dichlorobutene-1. To achieve this the reaction zone is supplied continuously with 1,4-dichlorobutene-2 or with a commercial mixture of 3,4-dichlorobutene-1 and 1,4-dichlorobutene-2; an inert gas is introduced into the bottom portion of said reaction zone; liquid material is heated to boiling therein; 3,4-dichlorobutene-1 is distilled off near the head of said reaction zone; 3,4-dichlorobutene-1 is conveyed to a distilling zone and fractionated therein until pure; pure 3,4-dichlorobutene-1 is condensed in a cooling zone; and 1,4-dichlorobutene-2 having high-boiling fractions enriched therein is isolated near the head of the separating zone.

3 Claims, 1 Drawing Figure

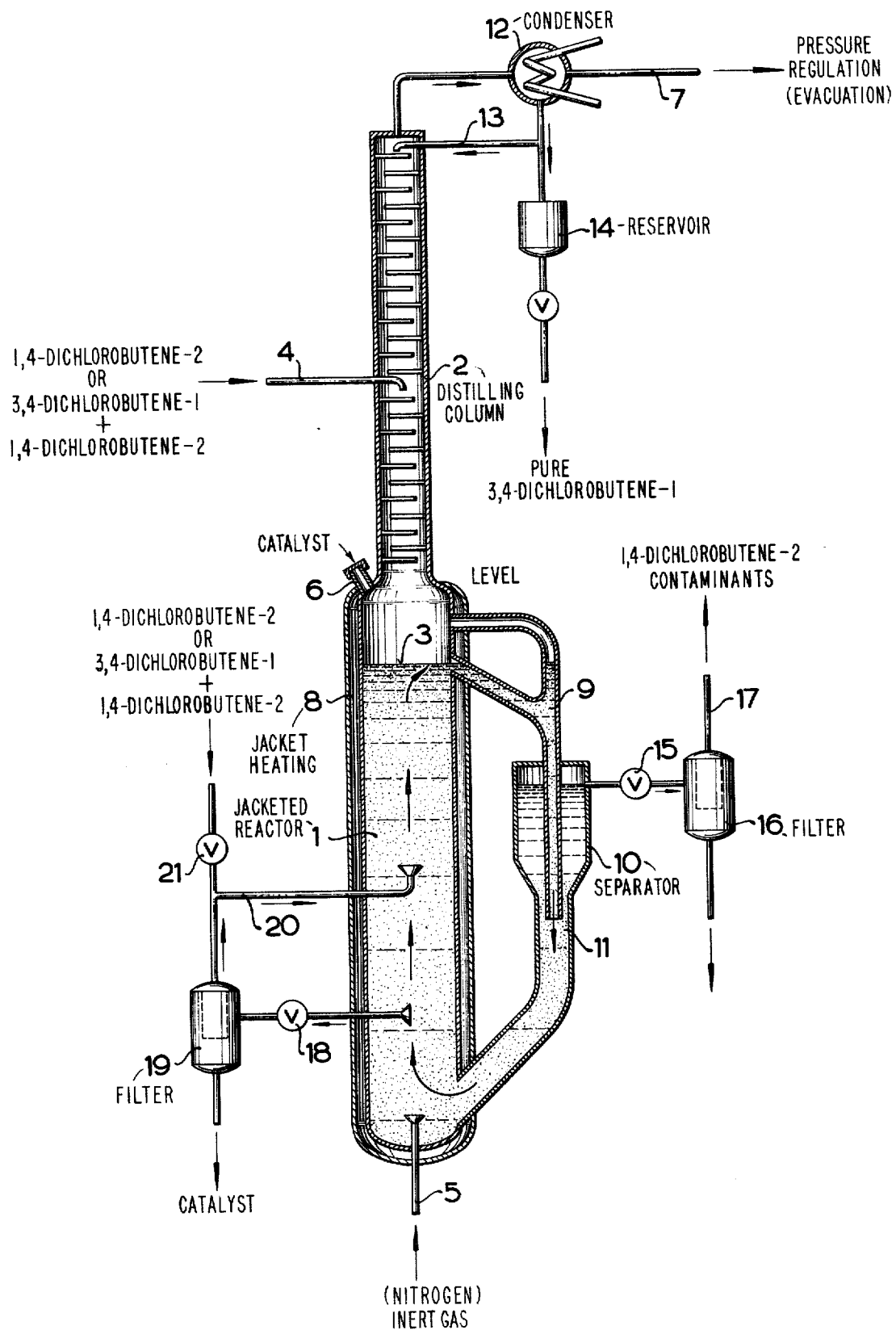

PROCESS FOR THE CONTINUOUS MANUFACTURE OF ,4-DICHLOROBUTENE-1

The present invention relates to the continuous manufacture of 3,4-dichlorobutene-1.

3,4-Dichlorobutene-1 is an important starting material for making 2-chlorobutadiene-1,3. In industry, 3,4-dichlorobutene-1 is produced by the conventional chlorination of butadiene-(1,3), in gas phase. The reaction product, which substantially consists of 3,4-dichlorobutene-1 and cis- and trans 1,4-dichlorobutenes-2, contains as further ingredients low-boiling fractions (butadiene, 1-chlorobutadiene-(1,3)) and high-boiling fractions (trichlorobutenes) in varying concentrations. Following purification, the mixture of dichlorobutenes and 1,4-dichlorobutene-2, which is contained therein, is isomerized in contact with catalysts so as to effect rearrangement to 3,4-dichlorobutene-1, which is distilled off consistently with its formation (cf. German published Specification DOS 1 950 971 and German Pat. No. 1 220 847).

Under practical conditions, the isomerization is effected predominantly in liquid phase with the use of a homogeneous or heterogeneous catalyst system (cf. German Pat. No. 1 287 063). While homogeneous catalysts have the particular merit of enabling a good exchange of material between the catalyst and dichlorobutene, the fact remains that it is impossible to recover the catalyst, and this is disadvantageous. Preference is therefore given to the use of heterogeneous catalysts, which are easy to isolate from the reaction liquid and which are accordingly easy to exchange. In this latter case, however, it is necessary to effect the reaction batchwise and this is a commercially very costly procedure. In addition thereto, the exchange of material between catalyst and reactant is found to diminish, if use is made of this reaction system.

Patent Application Ser. No. 192 871 describes a process which enables heterogeneous catalytic reactions to be carried out continuously in liquid phase, wherein the technologically beneficial effects of heterogeneous catalysis are combined with those of homogeneous catalysis, as the fluidized bed catalyst used therein ensures a very good exchange of material, in liquid phase.

The present invention now provides a process for carrying out heterogeneous catalytic reactions in liquid phase in accordance with Patent Application Ser. No. 192 871, in which a substantially uniform suspension of liquid starting material and fine particulate catalyst together with resulting reaction product is continuously conveyed upwardly in a reaction zone by the introduction, in accordance with the principle of an air-lift pump, of a gas or vaporous material near the bottom of the reaction zone, and recycled downwardly through a reflux line to the bottom of the reaction zone, the path of liquid material through the reflux line being interrupted by an injector system situated in a closed catalyst-separating zone containing recycle liquid; in which, following establishment of the reaction equilibrium, starting material is continuously supplied to the reaction zone and crude but catalyst-free recycle liquid is continuously removed near the head of the catalyst-separating zone, and recycle liquid which is to be removed is caused to travel through the catalyst-separating zone with the injector system therein towards the recycle liquid outlet at a velocity smaller than the sedimentation velocity of the catalyst under the operational conditions prevailing, the present process comprising isomerizing in conventional manner 1,4-dichlorobutene-2 to 3,4-dichlorobutene-1 in contact with a fixed bed catalyst at elevated temperature, under reduced pressure and while distilling off the 3,4-dichlorobutene-1 consistently with its formation, by the steps of supplying the reaction zone continuously with 1,4-dichlorobutene-2 or with a commercial mixture of 3,4-dichlorobutene-1 and 1,4-dichlorobutene-2; introducing an inert gas into the bottom portion of said reaction zone; heating liquid material to boiling therein; distilling off 3,4-dichlorobutene-1 near the head of said reaction zone; conveying the 3,4-dichlorobutene-1 to a distilling zone and fractionating it therein until pure, the distilling zone being placed directly downstream of the reaction zone; condensing the pure 3,4-dichlorobutene-1 in a cooling zone and isolating 1,4-dichlorobutene-2 having high-boiling fractions enriched therein near the head of the separating zone.

Further preferred features of the process of the present invention, which can be used singly or in combination, comprise:

a. introducing a commercial mixture of 3,4-dichlorobutene-1 and 1,4-dichlorobutene-2 substantially into the center portion of the distilling zone; directly distilling off the 3,4-dichlorobutene-1 fraction near the head of the distilling zone; condensing the said fraction and dropping down into the reaction zone for isomerization merely the high-boiling 1,4-dichlorobutene-2 fraction together with high-boiling contaminants which may be contained therein;

b. introducing the 1,4-dichlorobutene-2 substantially into the central portion of the distilling zone and dropping it down into the reaction zone;

c. directly introducing 1,4-dichlorobutene-2 or a commercial mixture of 3,4-dichlorobutene-1 and 1,4-dichlorobutene-2, into the reaction zone;

d. operating the reaction zone at temperatures between 80° and 110°C under pressures between 50 and 150 mm of mercury, preferably at temperatures between 90° and 95°C under a pressure of 100 mm of mercury.

A wide variety of metal and metal salt catalysts suitable for use in the isomerization of 1,4-dichlorobutene-2 to give 3,4-dichlorobutene-1 under substantially anhydrous conditions, in liquid phase have already been described, of which many can be used in the process of the present invention, provided that they are insoluble in the reaction mixture. Use can more particularly be made of copper-I-chloride on a $SiO_2$ or $Al_2O_3$-carrier, if desired in admixture with sodium chloride or potassium chloride.

The accompanying drawing is intended further to illustrate the process of the present invention. As can be seen, an apparatus is used which comprises a jacketed reactor 1 having a distilling column 2 mounted thereon. To initiate the reaction, the reactor may be filled first, up to level 3, with liquid starting material travelling through conduit 4. Following this, a slight stream of inert gas, which preferably is nitrogen, is injected through conduit 5 into and through the reactor and catalyst is introduced thereinto through pipe 6. By means of conduit 7, the reaction system is set to working pressure (for example 100 mm of mercury) and jacket heating 8 is set to work. The starting material is heated to boiling, the suspension of liquid and solid catalyst being circulated, this in accordance with the principle underlying an air-lift pump, through conduit 9, separator 10, conduit 11 and reactor 1. 3,4-Dichlorobutene-1 is distilled off overhead and condensed in cooler 12. A portion of resulting condensate is refluxed through conduit 13 to the head of distilling column 2 the balance portion being collected in reservoir 14. The quantity of 3,4-dichlorobutene-1 distilled off is replaced with a corresponding quantity of fresh starting material travelling through conduit 4. At the same time, recycle liquid which accumulates in separator 10, is removed therefrom through valved outlet 15 and a filtering means 16 (e.g. filter candles) and conduit 17. Catalyst, which may be found to have been expelled therewith (less than 1% per day) can be replaced by the introduction of fresh catalyst into the reactor, through conduit 6. Valve 18 and filtering means 19 are provided for the removal of relatively large quantities of catalyst from reactor 1, if necessary. In this case, the filtrate is returned to reactor 1 through conduit 20, which can also be used, instead of conduit 4, for the supply of fresh starting material, through valve 21.

As has been shown, it is possible in the process of the present invention continuously to supply starting material and continuously to remove 3,4-dichlorobutene-1, catalyst and recycle liquid.

While the functioning of the fluidized bed reactor could not be found to be affected by the temperature and pressure conditions prevailing in the reactor, it is preferable to balance these two conditions against one another in such a manner that at least the boiling point of 3,4-dichlorobutene-1 is reached. As the isomerization velocity is a function of the temperature, it is good practice to use a reaction temperature of more than 80°C.

The presence of contaminants, commonly high-boiling contaminants, in the isomerization reactor has been demonstrated in German Pat. No. 1 220 847 to involve the risk of gel formation therein. It is accordingly necessary continuously to remove and work-up a portion of the recycle liquid through conduit 17.

EXAMPLE

The Example was run in a pilot plant arranged as shown in the accompanying drawing. Reactor 1 with a capacity of 40 liters (height = 8 meters) was charged with starting material (32.5 weight % of 3,4-dichlorobutene-1, 65.3 weight % of 1,4-dichlorobutene-2, 2.0 weight % of higher-boiling contaminants ($bp_{760}$ > 155°C) and 0.2 weight % of lower-boiling contaminants ($bp_{760}$ < 115°C). 2.8 kg (6.9 liters) of catalyst were supplied through conduit 6 and 10 normal liters/hr (S.T.P.) of nitrogen were injected through conduit 5. The catalyst, which consisted of 6 weight % of CuCl on 94 weight % of a $SiO_2$-carrier, was used in the form of particles with a size between 60 and 150 microns. A vacuum of 100 mm of mercury was established in conduit 7 and a temperature of 95°C was produced in the reactor. 3,4-Dichlorobutene-1 was distilled off at a reflux ratio of 10:1 and a recycle liquid was simultaneously removed through valve 15, filtering means 16 and conduit 17. Conduit 4 was used to supply reactor 1 with the quantity of fresh starting material (1284 grams/hr) which was necessary just to replace the quantities of distillate (1065 grams/hr) and recycle liquid (219 grams/hr) removed.

In the apparatus described, 1,4-dichlorobutene-2 was isomerized to give 3,4-dichlorobutene-1 over a period of substantially two months with no disturbances. An average of 20 grams of catalyst was found to pass out of catalyst separator 10, for a throughput of substantially 30 kg of material per day. The catalyst accumulated in filtering means 16 and was recycled batchwise, however, without arresting the reaction, to reactor 1, through conduit 6.

The recycle liquid, which was removed through conduit 17, was composed of (weight %): 3.2 % of 3,4-dichlorobutene-1; 72.0 % of 1,4-dichlorobutene-2; 0.2 % of lower boiling contaminants ($bp_{760}$ < 115°C) and 24.6 % of higher-boiling contaminants ($bp_{760}$ > 155°C). The recycle liquid was free from catalyst and used for recovering unreacted 1,4-dichlorobutene-2 therefrom.

The condensate obtained in container 14 had a purity (weight %) of 98.8 % of 3,4-dichlorobutene-1; 0.16 % of 1,4-dichlorobutene-2; 0.3 % of 1-dichlorobutadiene-(1,3); 0.5 % of higher-boiling contaminants ($bp_{760}$ > 155°C) and 0.1 % of lower-boiling contaminants ($bp_{760}$ < 115°C). The catalyst performance substantially was 92 grams of 3,4-dichlorobutene-1 per liter of catalyst per hour.

We claim:

1. A process for isomerizing 1,4-dichlorobutene-2 in a reaction zone in contact with a catalyst containing copper-1-chloride on a carrier material in a fluidized bed in liquid phase at boiling temperatures between 80° and 110°C under pressures between 50 and 150 mm of mercury to give 3,4-dichlorobutene-1, which process comprises continuously conveying upwardly in the reaction zone a substantially uniform suspension of fine particulate catalyst and 1,4-dichlorobutene-2 or a commercial mixture of 3,4-dichlorobutene-1 and 1,4-dichlorobutene-2 together with resulting reaction product, the upward flow being effected by the introduction, in accordance with the principle of an air-lift pump, of inert gas into, near the bottom of, the reaction zone, removing the suspension from the top of the reaction zone and then recycling downwardly the suspension through a conduit to the bottom of the reaction zone; the recycled suspension passing through an injector system situated in said conduit in a closed catalyst separating zone containing recycle liquid consisting of 1,4-dichlorobutene-2, higher boiling contaminants and small quantities of 3,4-dichlorobutene-1, the injector system providing for a suction intake into said conduit; distilling off 3,4-dichlorobutene-1 near the head of the reaction zone; conveying the 3,4-dichlorobutene-1 to a distilling zone and fractionating it therein until pure; condensing the pure 3,4-dichlorobutene-1 in a cooling zone; following establishment of the reaction equilibrium, continuously supplying starting material to the reaction zone and/or to the center portion of the distilling zone and continuously removing catalyst-free recycle liquid near the head of the catalyst separating zone; flowing the recycle liquid, which is to be removed from the catalyst separating zone, downwardly through an injector in said zone and then upwardly through said catalyst separating zone on the outside of said injector towards a recycle liquid outlet near the head of said catalyst separating zone at a velocity smaller than the sedimentation velocity of the catalyst in the catalyst separating zone whereby the amount of catalyst removed with the recycle liquid is minimized.

2. The process as claimed in claim 1, which comprises introducing a commercial mixture of 3,4-dichlorobutene-1 and 1,4-dichlorobutene-2 substantially into the center portion of the distilling zone; directly distilling off the 3,4-dichlorobutene-1 fraction near the head of the distilling zone, separating said fraction and dropping down into the reaction zone for isomerization merely the high-boiling 1,4-dichlorobutene-2 fraction together with high-boiling contaminants which may be contained therein.

3. The process as claimed in claim 1, wherein the 1,4-dichlorobutene-2 is introduced substantially into the central portion of the distilling zone and dropped down into the reaction zone.

* * * * *